March 17, 1925.
H. A. VAN DUSEN
1,530,022
ANIMAL SINGEING DEVICE
Filed April 21, 1924
7 Sheets-Sheet 1
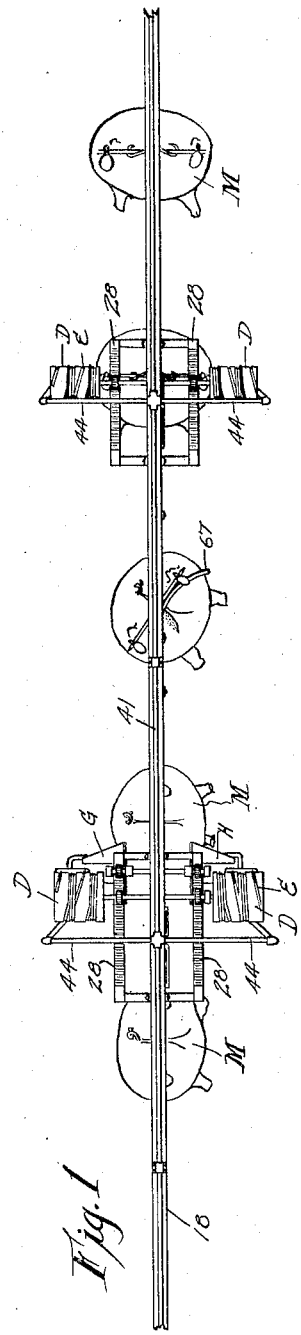
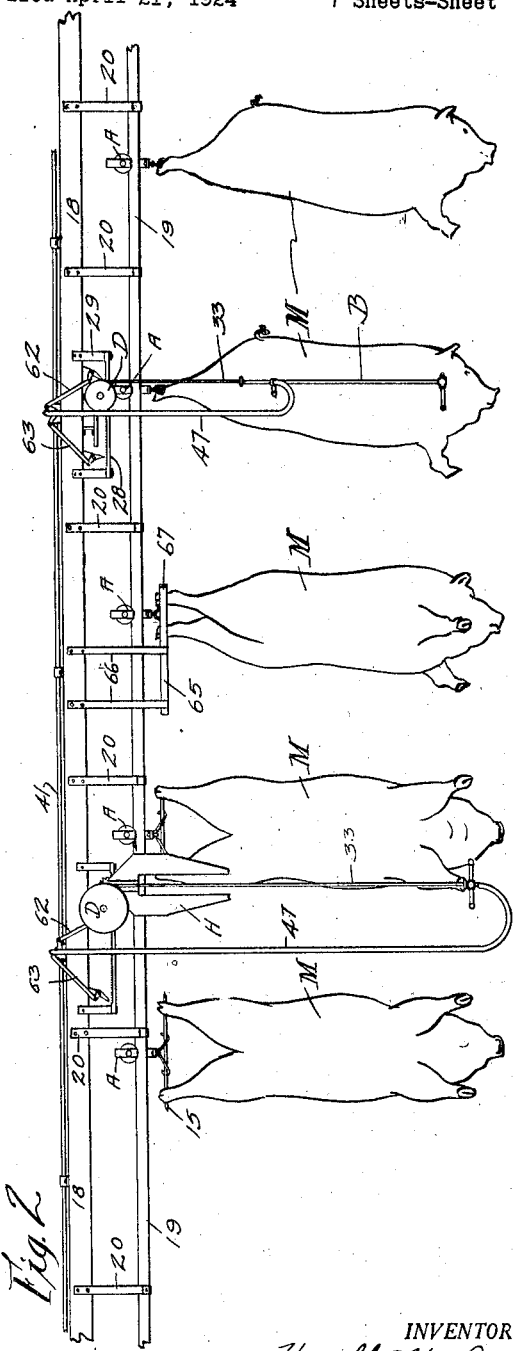
INVENTOR.
Harold A Van Dusen
BY Bailey Freeman
ATTORNEYS.

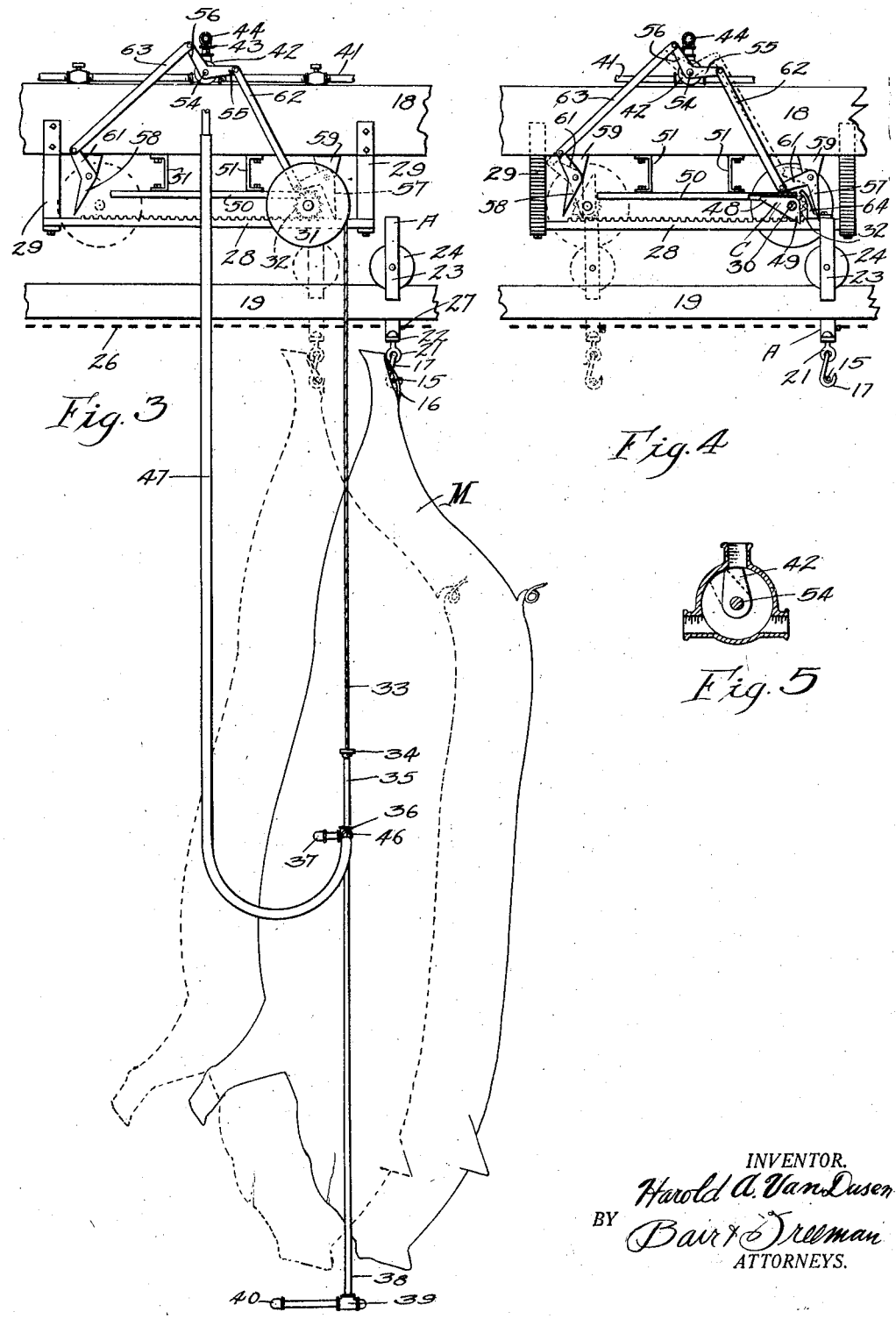

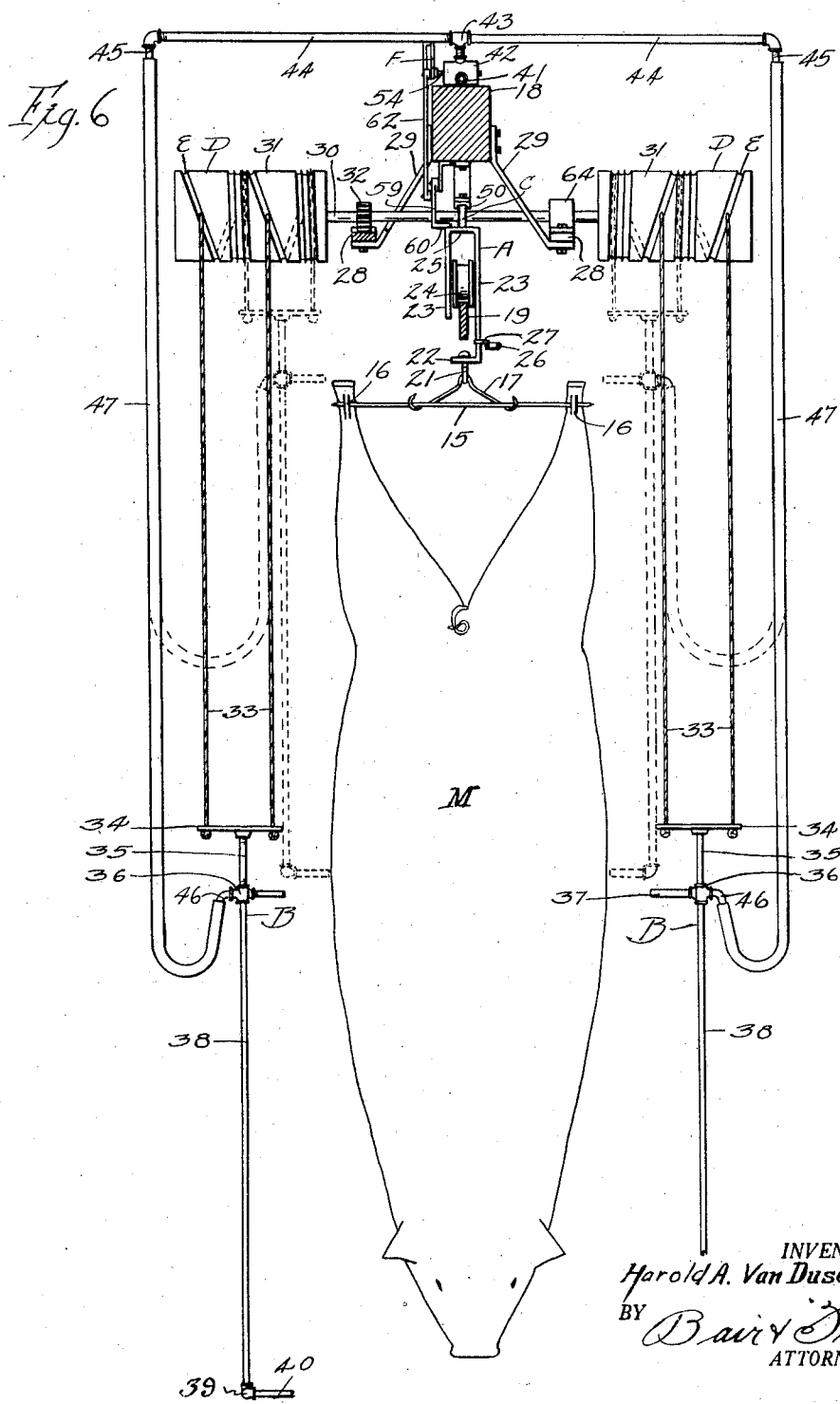

March 17, 1925.
H. A. VAN DUSEN
1,530,022
ANIMAL SINGEING DEVICE
Filed April 21, 1924 7 Sheets-Sheet 4
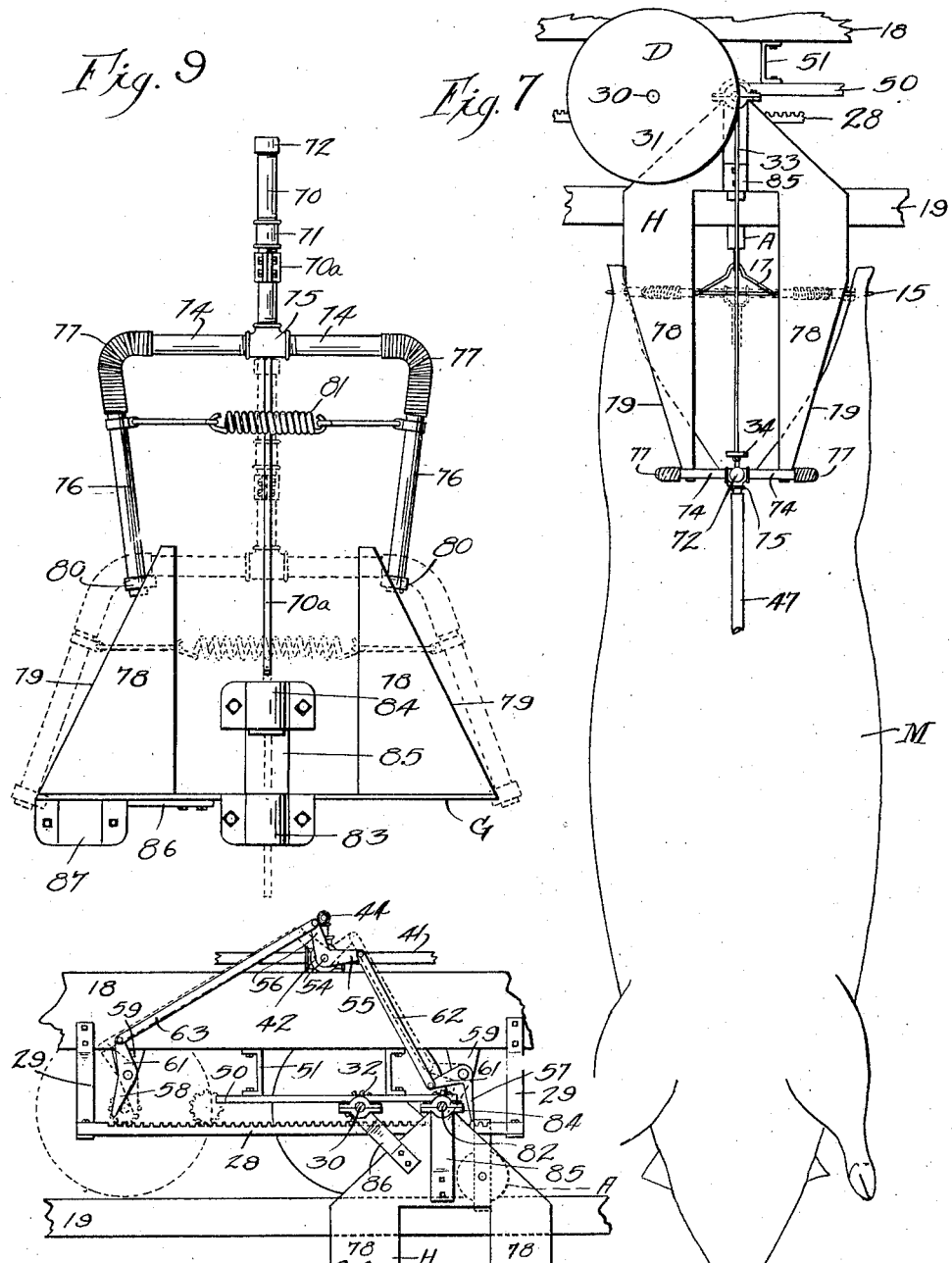
INVENTOR.
Harold A. Van Dusen
BY Bair & Freeman
ATTORNEYS.

March 17, 1925.
H. A. VAN DUSEN
ANIMAL SINGEING DEVICE
Filed April 21, 1924
1,530,022
7 Sheets-Sheet 5
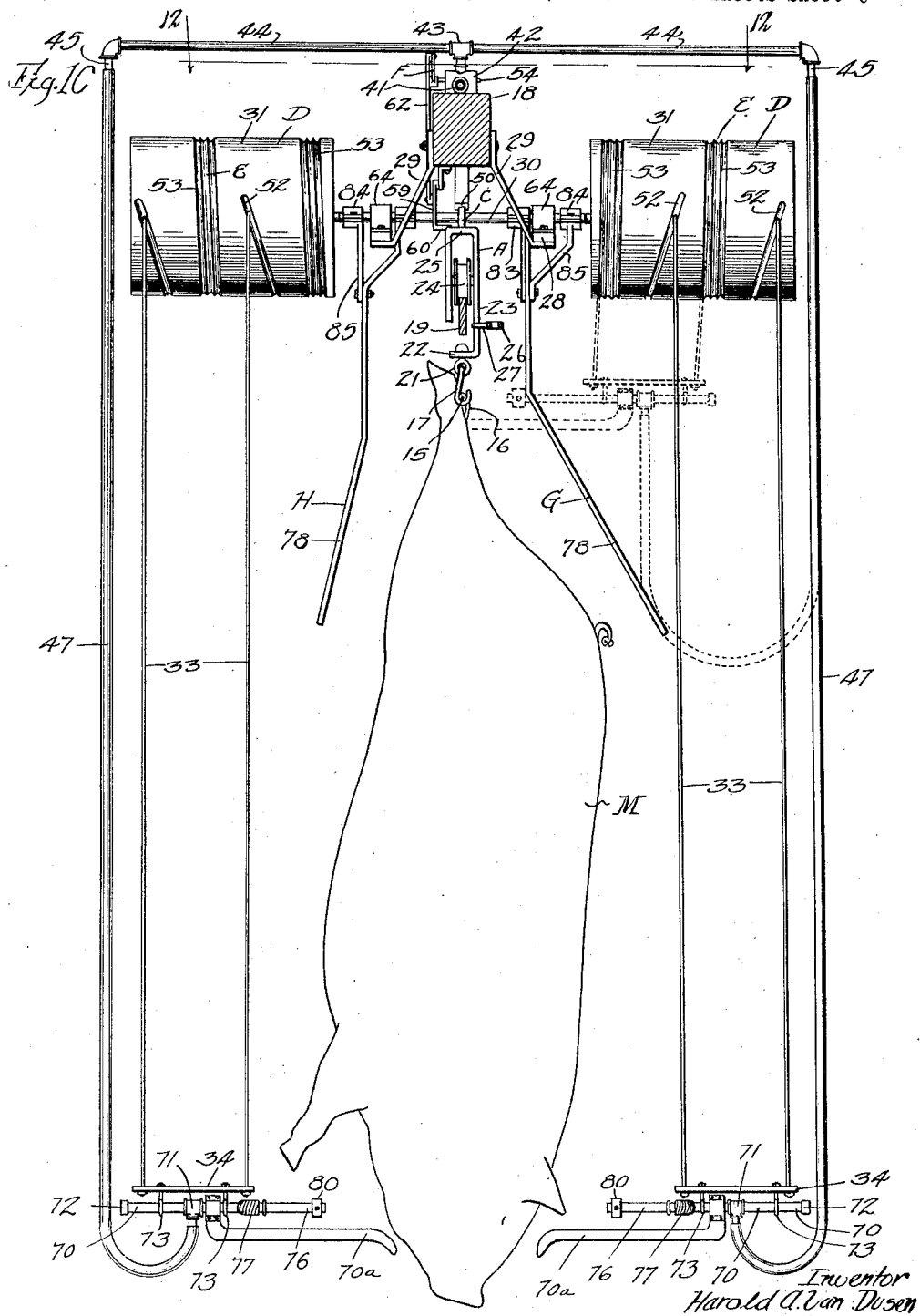

INVENTOR.
Harold A. Van Dusen
BY Bair & Freeman
ATTORNEYS.

March 17, 1925.

H. A. VAN DUSEN

ANIMAL SINGEING DEVICE

Filed April 21, 1924

Inventor
Harold A. Van Dusen
By Bair & Freeman
Attys

Patented Mar. 17, 1925.

1,530,022

UNITED STATES PATENT OFFICE.

HAROLD A. VAN DUSEN, OF SIOUX CITY, IOWA, ASSIGNOR OF ONE-HALF TO WALTER R. PRITCHARD, OF SIOUX CITY, IOWA.

ANIMAL-SINGEING DEVICE.

Application filed April 21, 1924. Serial No. 708,076.

*To all whom it may concern:*

Be it known that I, HAROLD A. VAN DUSEN, a citizen of the United States, and a resident of Sioux City, in the county of Woodbury and State of Iowa, have invented certain new and useful Improvements in Animal-Singeing Devices, of which the following is a specification.

My invention relates to an automatic apparatus for singeing animals, and has for its object to provide such an apparatus of simple, durable and inexpensive construction.

Another object is to provide such an apparatus which may be used for cleaning animals with water, compressed air, steam, or the like.

Another object is to provide such an apparatus wherein the singeing is done automatically without the help of a person during any of its stages.

More specifically it is my aim to provide such an apparatus including a rail for supporting traveling carriages, the animals being conveyed by the carriages past one portion of my singeing apparatus which is adapted to remove the bristles from the sides of each animal, the animal then being conveyed past another portion of my apparatus wherein the bristles are removed from the back and belly of the animal.

A further object is to provide in such an apparatus a continuously burning torch adapted to be automatically carried alongside of each animal a certain distance, and to be simultaneously moved from a position near the lower end of the animal to a position near the upper end thereof, and then to be returned to its original position awaiting the approach of the next animal.

Another object is to provide mechanism automatically operated by the advance of the carriage for controlling the movement of the torch, as set forth in the preceding object.

Still another object is to provide means for automatically increasing the flow of gas to the torch during the interval that it is used upon the animal, and for automatically cutting off the flow of gas after the animal has passed the length of the torch, a small amount of gas being allowed to flow during the latter interval in order to provide a pilot flame for keeping the torch continuously lighted.

Another object is to provide means for automatically turning the animal a quarter of a revolution between the two portions of my apparatus.

Another object is to provide means for causing the torch to follow the contour of the animal's body while the animal is being singed.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a plan view of my singeing apparatus, several animals being shown in the various positions assumed while being operated upon by the singeing apparatus.

Fig. 2 is an elevation of the same.

Fig. 3 is an enlarged elevation of that portion of my apparatus used for singeing the sides of an animal.

Fig. 4 is an elevation of the same, a portion of the mechanism being broken away to better illustrate the operation of the device.

Fig. 5 is a sectional view through the controlling valve for the gas line.

Fig. 6 is a transverse sectional view through the above mentioned portion of my apparatus.

Fig. 7 is an elevation of that portion of my apparatus which singes the front and back of an animal.

Fig. 8 is an elevation of the same illustrating the operative parts of the mechanism.

Fig. 9 is a plan view of a portion of the same illustrating the mechanism for spreading the torches so as to follow the contour of the legs of an animal.

Fig. 10 is a transverse sectional view through the rail showing the same.

Figure 11:
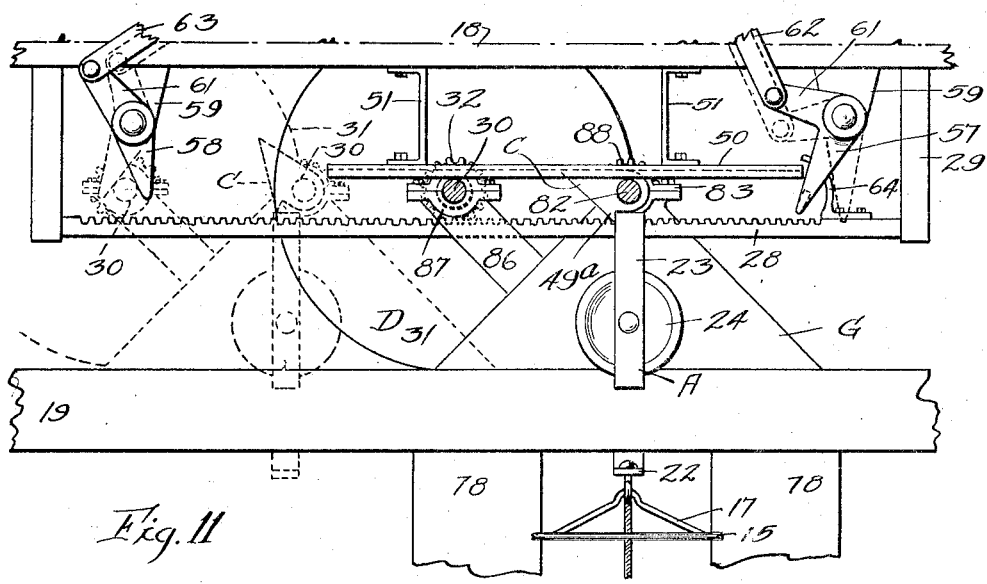
Fig. 11 is an enlarged detail sectional view of the operative mechanism of the latter mentioned portion of my apparatus.
Figure 12:
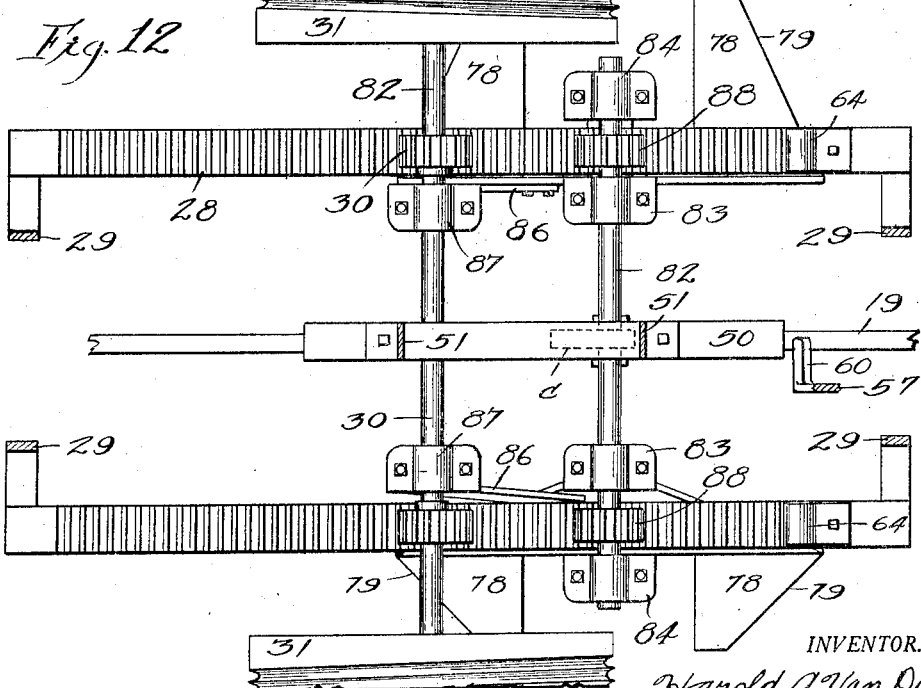
Fig. 12 is a plan view of the same taken on the line 12—12 of Fig. 10.

Before proceeding to describe in detail my improved apparatus, I will attempt to describe, generally, the process which is used at present in a packing plant for cleaning animals which have been killed for market.

The animal is first driven into an enclosure where it is grasped by a man, and a hook attached to its leg just above the ankle. To the hook is attached a cable, on the other end of which is a large hook which the operator places over a pin carried by a large rotating disk about twelve feet in diameter. As the pin travels upwardly on its circular path, it lifts the animal from the floor and deposits the upper hook upon an inclined rail, on which the animal slowly slides toward the butcher. The latter person sticks the animal, and it is then conveyed into another room where it is placed in a vat of boiling water, which softens the bristles preparatory to their removal.

In the drawings I have used the reference character, H, to indicate generally an animal, shown here in the form of a hog, which has been killed and is ready to be cleaned. The cleaning is entirely done while the animal hangs head downward from a suitable travelling carriage, which is conveyed along a rail around and to and fro through a large room wherein the various operations take place. A gambrel stick, 15, is first inserted under the tendons, 16, in the rear legs of the animal just above the ankle, and the stick, 15, is suitably supported in the hanger, 17, forming part of the travelling carriage. As the animal is conveyed through the room, it is first scraped by men armed with long sharp knives in order to remove the majority of the bristles. The animals are conveyed one after another in very close proximity to each other, and a great number of men are employed to do the work. Each man has a certain portion of the animal to which he confines his attention, and it is his duty to see that all of the bristles are removed from that particular portion of the body of the animal.

It will be seen from the foregoing description that in a large packing plant a great number of animals are being cleaned at once, and that in this way a large output is possible.

After the scraping has been done, a number of fine hairs remain which it is practically impossible to remove by scraping, and these must be singed off by suitable torches. In this operation, as well as in the scraping, a number of men are employed, ranging from three to six, and each confines his operation to a certain portion of the animal. The singeing is one of the most particular operations performed, and quite often the progress of the animals is delayed somewhat by the singers.

The greater amount of attention must be given to the belly and sides of the animal, the hairs on the jowls and face of the animal not being as abundant.

My improved apparatus is designed to entirely do away with the services of the men now used for singeing the animals and to perform the operations automatically as the animals are carried along the rails past the apparatus.

I will first describe the rail and travelling carriage:

A beam, 18, is suitably supported in the room where the cleaning operations take place, and serves to support the rail, 19, through the medium of the brackets, 20. In reference to Figs. 1 and 2 it may be said that the rail is shown as perfectly straight. It will be understood that the rail shown is a continuation of the rail which carries the animal through all of the various cleaning and dressing operations, some of which occur prior to the singeing, and some of which occur later. The rail, ordinarily, is run back and forth and around the room so as to occupy all of the available space, but that portion of the rail shown, and with which my invention deals, is preferably straight, as illustrated.

The hanger, 17, is supported by a swivel pin, 21, journaled in the laterally-extending arm, 22, of the travelling carriage A. The carriage includes the yoke member, 23, which extends above the rail and downwardly on either side thereof, and supports the trolley wheel, 24. The yoke, 23, is extended upwardly a considerable distance above the wheel, 24, and has the connecting member, 25, the purpose of which will hereinafter be set forth.

In order to convey the carriage, A, a chain, 26, is provided which has the laterally-extending fingers, 27, spaced in the proper interval thereon. The chain, 26, travels over suitable sprockets (not shown) and is positioned adjacent the rail, 19, so that the fingers, 27, will engage the yoke, 23, as illustrated in Fig. 6. It will be seen that by properly spacing the fingers, 27, the carriages, A, will be conveyed along the rail a proper distance apart, so that the various operations may be completed on each animal.

It will be noted that the carriages may be removed from the rail when desired.

I will now describe the first unit of my machine, comprising the apparatus for removing side bristles: Before proceeding to a detailed description of this portion of my invention, I will again briefly outline the mechanism employed.

In general I have provided a pair of singeing torches stationed one on each side of the rail so as to singe the animal upon both sides, and supported by cables on drums, which are so mounted that the carriage in proceeding along the rail past the apparatus will cause the drums to rotate and to simultaneously move forward so as to keep pace with the progress of the animal and at the same time to wind up the cables so as to raise the torches along the sides of the animal.

In order to cause the drums to rotate they are supported by means of spur gears, which are in turn mounted on racks, on which they travel back and forth. The racks which I have designated by the reference numeral, 28, are supported by the brackets, 29, suitably fixed to the beam, 18. A shaft, 30, supports the drums, 31, and has fixed to it, by means of suitable taper pins or keys, the spur pinions, 32, which are mounted upon and in mesh with the teeth of the racks, 28.

The torches, B, are as follows: Suitably fastened to the drums, 31, are the cables, 33, which support the bars, 34, into which are fixed the suspending brackets, 35, for the torches. The brackets, 35, may be made of gas pipe and screwed into the bars, 34. To the lower end of the pipes, 35, are fixed the connections, 36, which receive the upper nozzles, 37, and the downwardly-extending gas tubes, 38, which carry gas to the lower nozzles. To the lower end of the tubes, 38, are fixed the fittings, 39, which receive the two nozzles, 40, of the lower torches.

It will be noted that the nozzles, 40, are spaced on either side of the perpendicular line extending through the nozzles, 37. The advantage of this construction will be seen when it is understood that the lower nozzles cover the main portions of the body of the animal, while the upper nozzle is primarily for the purpose of singeing the legs, which are of lesser width than the body.

The gas line, 41, is suitably supported on the beam, 18, and is connected to the valve, 42, which is positioned above that portion of the mechanism now being described. To the valve, 42, is fixed the T-fitting, 43, which supports the laterally-extending pipes, 44, having on their ends the downwardly-extending nipples, 45. In the fittings, 36, are the nipples, 46. Flexible tubes, 47, connect the nipples, 45, with the nipples, 46. The tubes, 47, are preferably made of rubber hose, or the like. It will be seen that as the nozzles are raised the flexible connecting tubes, 47, will follow so as to keep them at all times in connection with the gas supply.

I will now describe the means for intermittently moving the drums forwardly so as to keep pace with the advance of the animal-supporting carriage, A, during a portion of its movement. It may be mentioned here that that portion of the mechanism which comprises, in the form illustrated herewith, the drums, 31, the shaft, 30, and the spur pinions, 32, will be referred to generally as the reciprocating unit, since it moves alternately forward and back.

It is necessary to provide means for engaging the reciprocating unit through the medium of the travelling carriage during a predetermined interval of the advance of the carriage, and then to release the carriage so as to allow it to proceed while the reciprocating unit returns to its original position.

In the preferred form of my invention I employ a trigger, C, (shown in Fig. 4), which has the general shape of a triangle, and has the forwardly-extending arm, 48, and the downwardly-extending arm, 49.

The trigger, C, is rotatably mounted on the shaft, 30, directly above the rail, 19, and the arm, 49, extends downwardly across the path of travel of the member, 25, of the travelling carriage, A. The purpose of the arm, 48, is to prevent rotation of the trigger, C, around its axis during the predetermined interval of advance of the carriage, hereinbefore referred to.

In order to accomplish this a short rail, 50, is provided, which is in the form of an inverted channel and supported by the brackets, 51, on the beam, 18. The rail, 50, is fixed just above the trigger in such a plane that contact of the arm, 48, with the under surface of the rail will maintain the arm in horizontal position as shown in Fig. 4, while allowing it to slide forwardly.

It will now be seen that as the carriage, A, moves forwardly it will engage the arm, 49, of the trigger and push the reciprocating unit, which I will hereinafter refer to by the reference character, D, forwardly until the trigger has reached the end of the rail, 50, when the trigger will be allowed to rotate around the shaft, 30, to the position shown in dotted lines in Fig. 4. The rail, 50, is of such length that when the trigger has reached the latter mentioned position the cables will have been entirely wound upon the drums, 31, and the nozzles thereby carried upwardly along the entire length of the animal's sides.

It will be noted that when the trigger has rotated to the position shown in dotted lines in Fig. 4 that the arm, 49, will be held and positioned at such a height that the travelling carriage will be allowed to proceed past the trigger, the member, 25, sliding under the arm, 49.

When the reciprocating unit has thus been released by the travelling carriage it will be caused to return to its original position (shown in full lines in Fig. 6) by the weight of the nozzles tending to rotate the drums, 31.

It is desirable that the nozzles be positioned at a distance from the animal before the singeing operation commences and when the animal has reached the position for the singeing operation to commence that the nozzles be brought rapidly toward the sides of the animal at the beginning of their upward journey. This is particularly desirable where the torches are allowed to burn continuously with the flame undiminished.

In this connection it may be stated that although I have shown automatic mechanism for reducing the size of the flame of the torches during the interval of time when they are not used, I do not intend to limit myself to the use of such automatic mechanism, and my invention may be embodied in an apparatus in which the torches burn continuously with a full flame. In such a case the torches must be positioned away from the animal and brought toward the animal after they have commenced their upward journey in order that the flame may not be allowed to rest continuously on any one spot so as to scorch the hide.

In the preferred form of my invention I have shown the following described means for accomplishing this object. In the drums, 31, are the spiral grooves, E, which encircle the drum, as at 52, at a considerable pitch. The portions, 52, of the grooves extend from the outer edge and the center, respectively, of each drum to points very near the center and inner edge, respectively, of each drum, from which points they are continued, as at 53, and encircle the drum several times with a pitch equal merely to the width of the grooves.

It will be seen that as the drums are rotated the cables, 33, will follow the grooves, E, so as to convey the torches inwardly to a point where they are properly spaced from the sides of the animal and will then be wound upon the drums so as to raise the torches almost vertically along the sides of the animal. The inward motion of the torches is accomplished during about a quarter of a revolution of the drums.

I will now describe the mechanism for automatically regulating the flow of gas to the tubes. To the valve stem, 54, of the valve, 42, is fixed a bell-crank lever, F, having the arms, 55 and 56. The triggers, 57 and 58, are pivoted to brackets, 59, fixed to the under side of the beam, 18, and have the inwardly-extending fingers, 60, extending into the path of travel of the carriage, A. The triggers, 57, are in the form of bell-crank levers, having the arms, 61, which are connected through the medium of the links 62, and 63, to the arms, 55 and 56, respectively, of the lever, F. The triggers, 57 and 58, are so positioned that when the fingers, 60, are in their lowermost position they will be in the path of travel of the carriage, A, and will be engaged by the carriage in its forward motion and cause the triggers to swing around on their pivots until the fingers, 60, have raised above the path of the carriage, A, so as to allow the carriage to pass.

The parts are so arranged that as the carriage has passed the trigger, 58, and pushed it to the position shown in Fig. 3, the valve, 42, will be closed, as shown in Fig. 5, and the trigger, 57, will have been moved to its lower position (shown in Fig. 4) where it will be engaged by the next carriage.

When the next carriage approaches it will engage the trigger, 57, and move it forward so as to move the parts to the position shown in dotted lines in Fig. 4 and open the valve as illustrated in dotted lines in Fig. 5. The gas will thus be allowed to flow in full forces to the torches and the flames of the torches will be increased to their full size for singeing the animals. The singeing will then take place during the interval while the carriage is moving from the trigger, 57, to the trigger, 58, and when the carriage has reached the latter position the trigger, C, will be released for allowing the torches to return to their initial position, and the trigger, 58, will simultaneously be engaged so as to shut off the supply of gas.

In order to limit the travel of the reciprocating carriage laterally, I provide the stops, 64, which are fixed to the racks, 28, and against which the spur pinions, 32, will come to a stop.

Figure 13:
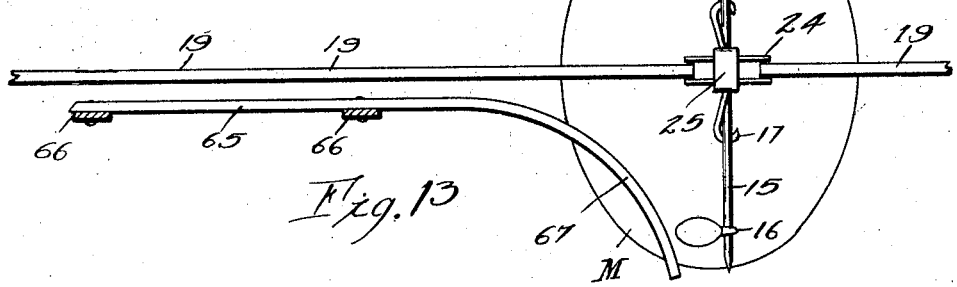
Fig. 13 is a detailed plan view of the device for turning the animals.

After the sides of the animal have been properly singed it is next necessary to singe the belly and back, and in order to utilize a mechanism similar to that already described, it will be seen that the animal must be turned a quarter of a revolution. For this purpose I provide a gambrel stick, as shown in Fig. 13, which comprises a strip of strap iron, 65, supported by the hangers, 66, and curved at its forward end, as at 67. The straight portion, 65, of this stick is spaced close to the rail, 19, as shown, so that the legs of the animal will both be engaged by the stick after the animal has been turned. Thus it will be seen that the animal will be positioned with its two legs parallel to the rail. The curved portion, 67, first engages one of the legs of the animal and arrests its advance so as to swing the animal around, the swivel, 21, allowing pivotal movement. It will be seen that the tendency of the animal to rotate, caused by its momentum, is overcome by the contact of the other leg of the animal against the straight portion of the stick.

After the animal has been thus turned it is ready for the apparatus for singeing the belly and back of the animal.

This portion of my apparatus involves practically the same construction as that already described, with the addition of means for causing the torches to follow the contour of the animal.

Before proceeding in detail to describe this mechanism, it may be stated that the same might be employed in slightly modified form for the preceding operation, but is more essential to the operation now to be described because the contour of the animal is more irregular and varies more from a straight line along the belly and back than it does along the sides. This will be readily seen by a comparison of Figs. 6 and 10.

In this portion of my apparatus I have shown only two nozzles, which are positioned in the same plane. The reciprocating unit, D, is the same as that already described and includes the shaft, 30, the spur pinions, 32, and the drums, 31; the pinions, 32, being mounted for travel on the racks, 28, which are in turn supported by the brackets, 29. The drums, 31, are of increased diameter in order to allow a greater range of movement of the torches. The torch frames 34, are suspended by means of the cables, 33, and support the pipes, 70, which are connected by means of nipples, 71, to the flexible tubes, 47. The outer ends of the pipes, 70, are closed by caps, 72. The pipes, 70, are supported by eyebolts, 73, anchored in the frames, 34. At their forward ends the pipes, 70, support the laterally-extending tubes, 74, and are connected thereto by means of unions, 75. The nozzles, 76, extend inwardly from the ends of the tubes, 74, and are connected therewith by the flexible elbow tubes, 77, which are designed to allow swinging motion of the nozzles.

Before proceeding further it may be stated that it is my object to provide means for spreading the nozzles, 76, when they reach the legs of the animal so as to follow the legs, which ordinarily are extended upwardly and outwardly at an angle to each other, as shown in Fig. 7. For this purpose the guide plates, G and H, are provided, which are suitably supported as will hereinafter be described, so as to form part of the reciprocating unit.

Each of the guide plates, G and H, have the downwardly-extending arms, 78, which have their outer edges inclined, as at 79, and their lower ends so positioned as to engage the inner ends of the nozzles between the nozzles during the upward advance thereof. The arms, 78, are bent downwardly and outwardly so as to follow the contour of the legs of the animal in a plane perpendicular to the rail. The beveled edges, 79, cause the nozzles to follow the contour of the legs in planes parallel with the rails. In order to maintain the engagement of the nozzles with the edges, 79, the ends of the nozzles, 76, are fitted with collars, 80.

It will be seen that as the nozzles are raised the racks, 78, will spread them so as to follow the contour of the legs in a plane parallel to the rail, and will draw them inwardly so as to follow the contour of the legs in a plane perpendicular to the rail.

I provide means for spacing the ends of the nozzles at a uniform distance from the animal as they are drawn upwardly. It comprises a guide runner, 70$^a$, which is fixed to the tube, 70, and extends toward the animal between the two nozzles. It will be seen that as the nozzles are carried toward the animal the runner, 70$^a$, will contact with the animal and thus hold the nozzles in correct spaced relation as they travel upwardly.

The plates, G and H, are supported on shafts, 82, the bearings, 83, on the plates, G, being provided for this purpose. Bearings, 84, supported by brackets, 85, fixed to the plates, G and H, serve to brace the plates against movement toward or away from each other, and the braces, 86, fastened to the plates are extended to the shaft, 30, and connected therewith by means of the bearings, 87, so as to prevent swinging movement of the plates around the shaft, 82. The shaft, 82, is supported by the spur pinions, 88, which ride on the racks, 28.

It will be seen that the plates are thus supported rigidly and are connected with the reciprocating unit so as to form an integral part thereof. The trigger, C, is carried by the shaft, 82, and is slightly modified so as to allow the carriage, A, to be centered in the vertical plane in which the cables, 33 are included (see Fig. 11). The arm, 49$^a$, is positioned forwardly of the center of the shaft 82, as shown in Fig. 11. It will be noted that the rack, 28, is increased in length a distance equal to a distance between the shafts, 82 and 30. The trigger, 58, in this portion of my apparatus may be engaged by the shaft, 30, in place of the carriage, A.

Figure 14:
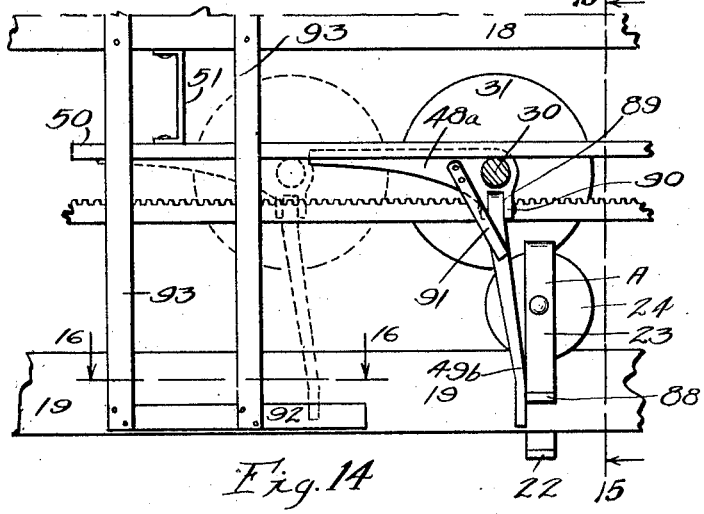
Fig. 14 is an elevation, partly in section, of a modified form of trigger mechanism.
Figure 15:
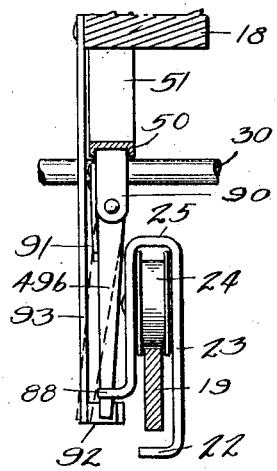
Fig. 15 is a transverse sectional view of the same, taken on the line 15—15 of Fig. 14.
Figure 16:
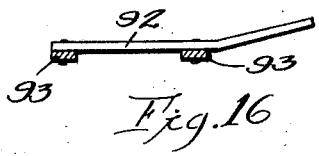
Fig. 16 is a detail of a portion of the same, taken on the line 16—16 of Fig. 14.

In Figs. 14 and 15 I have shown a slightly modified form of the trigger, C. In explanation it may be said that the forward pull of the chain, 26, at the lower end of the carriage, A, will tend to turn the lower end forwardly, the upper end being retarded by the pull of the reciprocating carriage transmitted thereto by the trigger, C. Ordinarily the weight of the animal will keep the carriage in a sufficiently vertical position so that the mechanism will operate satisfactorily. However, where the weights of the animals differ greatly, the difference in inclination of the carriages will not interfere with the operation of the trigger, C, because the upper end of the carriage will be drawn downwardly slightly when the carriage is inclined. I remedy this objection by providing the arm, 49$^b$, which is extended downwardly to a point in the same horizontal plane as the chain, 26. The trigger mechanism, C, is disposed in a vertical plane which is spaced laterally from the rail, and the projecting finger, 88, is provided on the carriage, A, to engage the arm, 49$^b$. The arm, 49$^b$ is pivoted at 89 between the two downwardly-extending ears, 90, on the arm, 48$^a$, and is designed to swing laterally out of the path of movement of the finger, 88. A spring, 91, tends to maintain the arm, 49$^b$ inwardly in the path of the finger, 88. A guide finger, 92, is supported by the hangers, 93, from the beam, 18, and is inclined inwardly toward the rail at its forward end and so positioned as to engage the projecting end of the arm, 49$^b$, during its forward travel.

It will be seen that as the arm, 49$^b$, is pushed forwardly, it will be drawn by the guide strip, 92, laterally until it is released from engagement with the finger, 88. The reciprocating carriage will then be allowed to return to its initial position as heretofore described.

It will be understood that the apparatus described for singeing the belly and back of the animals might be adapted for use in both operations, or that the first described portion of my apparatus might be utilized in either case without departing from the real spirit and scope of my invention.

It will further be understood that various forms of trigger mechanism, whereby the travelling carriage engages the reciprocating unit so as to move it forward a predetermined distance and then realse it, might also be employed without departing from the scope of my invention.

During the process of cleaning the animals it is necessary to wash them with water from hose manipulated by workmen, and it will be seen that my apparatus may be used for automatically spraying water onto the animals, as well as for singeing.

Another use to which may apparatus may be put is to project air or steam under pressure against the sides of the animal for removing small particles of dirt and loose bristles, as well as for drying purposes.

It will be seen that in either of these applications of the apparatus very little change may be made save that for the gas line will be substituted a water pipe line connected to a water tank, or an air line connected to an air pressure tank.

It will be understood that the apparatus may be used where oil burning torches are substituted for the gas torches described. In such an application of my invention, the automatic controlling mechanism for the flame will probably not be used.

It is believed that the advantages of my device are obvious in that the assistance of a number of skilled laborers is eliminated, and the parts may be so adjusted that the singeing will be absolutely uniform on each animal.

Other changes may be made in the construction and details of the various parts of my invention without departing from the spirit and scope thereof, and it is my intention to cover by my claims any modified forms of structure, or use of mechanical equivalents which may be reasonably included within their scope.

I claim as my invention:

1. In a hog singeing device, a rail, travelling carriages thereon, for supporting hogs, means for advancing said carriages, a reciprocating unit, singeing nozzles carried by said unit, a trigger on the reciprocating unit adapted to be engaged successively by each carriage and moved forward a predetermined distance and then released, thereby moving the reciprocating unit forward the same distance, means for returning the reciprocating unit to its original position, and means for varying the height of the nozzles as the reciprocating unit moves forward.

2. In a hog singeing device, travelling carriages for supporting hogs, means for advancing said carriages, a reciprocating unit, singeing nozzles carried by said unit, a trigger on the reciprocating unit adapted to be engaged successively by each carriage and moved forward a predetermined distance and then released, thereby moving the reciprocating unit forward the same distance, means for returning the reciprocating unit to its original position, and means for varying the height of the nozzles as the reciprocating unit moves forward.

3. In a hog singeing device, a rail, travelling carriages thereon, for supporting hogs, means for advancing said carriages, the carriages being capable of ready removal from the rail and from engagement with the advancing means, a reciprocating unit, singeing nozzles carried by said unit, a trigger on the reciprocating unit adapted to be engaged successively by each carriage and moved forward a predetermined distance and then released, thereby moving the reciprocating unit forward the same distance, means for returning the reciprocating unit to its original position, and means for varying the height of the nozzles as the reciprocating unit moves forward.

4. In a hog singeing device, a rail, travelling carriages thereon, for supporting hogs, means for advancing said carriages, a reciprocating unit, singeing nozzles carried by said unit, the reciprocating unit being adapted to be engaged successively by each carriage and moved forward a predetermined distance and then released, means for returning the reciprocating unit to its original position, and means for varying the height of the nozzles as the reciprocating unit moves forward.

5. In a hog singeing device, a rail, travelling carriages thereon, for supporting hogs, means for advancing said carriages, a reciprocating unit, singeing nozzles carried by said unit, the reciprocating unit being adapted to be engaged successively by each carriage and moved forward a predetermined distance and then released, means for returning the reciprocating unit to its original position, and means for varying the height of the nozzles as the reciprocating unit moves forward, said means comprising rotatable drums carried by the reciprocating unit, suspending cables supporting the nozzles, and means actuated by the forward movement of the reciprocating unit for rotating the drums and winding the cables upon the drums.

6. In a hog singeing device, a rail, travelling carriages thereon, for supporting hogs, means for advancing said carriages, a reciprocating unit, singeing nozzles carried by said unit, the reciprocating unit being adapted to be engaged successively by each carriage and moved forward a predetermined distance and then released, means for returning the reciprocating unit to its original position, and means for varying the height of the nozzles as the reciprocating unit moves forward, said means comprising rotatable drums carried by the reciprocating unit, suspending cables supporting the nozzles, and means actuated by the forward movement of the reciprocating unit for rotating the drums and winding the cables upon the drums, the drums having helical grooves for guiding the cables toward the carriage.

7. In a hog singeing device, a rail, travelling carriages thereon, for supporting hogs, means for advancing said carriages, a reciprocating unit, singeing nozzles carried by said unit, the reciprocating unit being adapted to be engaged successively by each carriage and moved forward a predetermined distance and then released, and means for varying the height of the nozzles as the reciprocating unit moves forward.

8. In a hog singeing device, travelling carriages for supporting hogs, means for advancing said carriages, a reciprocating unit, singeing nozzles carried by said unit, the reciprocating unit being adapted to be engaged successively by each carriage and moved forward a predetermined distance and then released, and means for varying the height of the nozzles as the reciprocating unit moves forward.

9. In a hog singeing device, travelling carriages for supporting hogs, singeing nozzles, means for advancing the carriages past the singeing nozzles, and means for varying the height of the nozzles as the carriages pass them.

10. In a hog singeing device, a rail, travelling carriages thereon, for supporting hogs, means for advancing said carriages, a reciprocating unit, singeing nozzles carried by said unit, a trigger on the reciprocating unit adapted to be engaged successively by each carriage and moved forward a predetermined distance and then released, thereby moving the reciprocating unit forward the same distance, and means for varying the height of the nozzles as the reciprocating unit moves forward, said means comprising rotatable drums carried by the reciprocating unit, suspending cables supporting the nozzles, and means actuated by the forward movement of the reciprocating unit for rotating the drums and winding the cables thereon, the nozzles being adapted to unwind the cables from the drums when the trigger is released, and to thereby return the reciprocating unit to its original position.

11. In a hog singeing device, travelling carriages for supporting hogs, means for advancing said carriages, a reciprocating unit comprising a shaft, pinions fixed thereon, drums fixed on said shaft, racks on which the pinions travel, a trigger mounted on the shaft and normally disposed in the path of advance of the carriages, means for maintaining the trigger in the path of the advance of the carriages during a predetermined period of such advance, whereby the carriages will move the reciprocating unit forward, said last means being adapted to release the trigger at the end of said period, and to allow it to swing out of the path of advance of the carriages, cables on the drums, singeing nozzles depending from said cables, the advance of the reciprocating unit causing the drums to rotate and thus raise the nozzles and the nozzles being adapted to unwind the cables and thereby return the reciprocating unit to its initial position.

12. In a hog singeing device, travelling carriages for supporting hogs, means for advancing said carriages, a reciprocating unit, a trigger on said reciprocating unit normally disposed in the path of advance of the carriages, means for maintaining the trigger in the path of advance of the carriages during a predetermined period of such advance, whereby the carriages will move the reciprocating unit forward, said last means being adapted to release the trigger at the end of said period, and to allow it to swing out of the path of advance of the carriages, singeing nozzles supported by the reciprocating unit, and means for varying the height of said nozzles as the reciprocating unit is moved forward.

13. In a hog cleaning device, travelling carriages for supporting hogs, means for advancing said carriages, a reciprocating unit, cleaning tools carried by said reciprocating unit and adapted to be raised thereby as the reciprocating unit moves forward, and means for connecting the travelling carriages during an interval of their movement to the reciprocating unit and then releasing the reciprocating unit.

14. In a hog cleaning device, travelling carriages for supporting hogs, means for advancing said carriages, a reciprocating unit, cleaning tools carried by said unit and adapted to have their height varied as the reciprocating unit moves forward, and means for connecting the travelling carriages during an interval of their movement to the reciprocating unit and then releasing the reciprocating unit.

15. In a hog cleaning device, travelling carriages for supporting hogs, means for advancing said carriages, a reciprocating unit, cleaning tools carried by said unit, means for connecting the travelling carriages during an interval of their movement to the reciprocating unit and then releasing the reciprocating unit, means for conducting fluid to the cleaning tools, and controlling means for cutting off the flow of the fluid during the interval after releasing of the reciprocating unit by one carriage and its engagement by the next carriage, said controlling means being actuated by the advance of the carriages.

16. In a hog cleaning device, travelling carriages for supporting hogs, means for advancing said carriages, a reciprocating unit, cleaning tools carried by said unit, means for connecting the travelling carriages during an interval of their movement to the reciprocating unit and then releasing the reciprocating unit.

17. In a hog singeing device, a rail, travelling carriages thereon, for supporting hogs, means for advancing said carriages, a reciprocating unit, singeing nozzles carried by said unit, the reciprocating unit being adapted to be engaged successively by each carriage and moved forward a predetermined distance and then released, means for returning the reciprocating unit to its original position, and means for varying the height of the nozzles as the reciprocating unit moves forward, said means comprising rotatable drums carried by the reciprocating unit, suspending cables supporting the nozzles, means actuated by the forward movement of the reciprocating unit for rotating the drums and winding the cables upon the drums, and means for causing the nozzles to follow the contour of the hog as their height is raised.

18. In a hog cleaning device, travelling carriages for supporting hogs, means for advancing said carriages, a reciprocating unit, cleaning tools carried by said unit and adapted to have their height varied as the reciprocating unit moves forward, means for connecting the travelling carriages during an interval of their movement to the reciprocating unit and then releasing the reciprocating unit, and means for causing the nozzles to follow the contour of the hog as their height is raised.

Signed at Sioux City, in the county of Woodbury and State of Iowa, this 12th day of April, 1924.

HAROLD A. VAN DUSEN.